(12) United States Patent
Burton et al.

(10) Patent No.: US 9,067,237 B1
(45) Date of Patent: Jun. 30, 2015

(54) HIGH TEMPERATURE MULTI-COLOR CERAMIC COATING APPLICATION WITH PATTERNS AND/OR LETTERING

(71) Applicant: JET HOT LLC, Burlington, NC (US)

(72) Inventors: David Raymond Burton, Burlington, NC (US); Daniel Jerry Bates, Burlington, NC (US); Gordon Ronald McGilton, Clayton, NC (US)

(73) Assignee: Jet Hot, LLC, Burlington, NC (US)

( * ) Notice: Subject to any disclaimer, the term of this patent is extended or adjusted under 35 U.S.C. 154(b) by 25 days.

(21) Appl. No.: 14/057,513

(22) Filed: Oct. 18, 2013

(51) Int. Cl.
*B32B 3/00* (2006.01)
*B05D 5/00* (2006.01)
*C09D 5/03* (2006.01)
*B32B 3/14* (2006.01)

(52) U.S. Cl.
CPC .. *B05D 5/00* (2013.01); *C09D 5/03* (2013.01); *B32B 3/14* (2013.01)

(58) Field of Classification Search
CPC .................................. C09D 5/03; B32B 3/14
See application file for complete search history.

(56) References Cited

U.S. PATENT DOCUMENTS

| | | | | |
|---|---|---|---|---|
| 4,074,010 A | | 2/1978 | Knight | 428/422 |
| 5,460,087 A | * | 10/1995 | Ogorzalek | 101/128.21 |
| 7,559,991 B2 | | 7/2009 | Burton et al. | 118/641 |
| 7,562,647 B2 | | 7/2009 | Burton et al. | 123/188.3 |
| 2006/0065192 A1 | * | 3/2006 | DeVilbiss, III | 118/313 |
| 2008/0032065 A1 | | 2/2008 | Burton et al. | |

* cited by examiner

*Primary Examiner* — Elizabeth Mulvaney
(74) *Attorney, Agent, or Firm* — MacCord Mason PLLC

(57) ABSTRACT

A coated part includes a metal substrate having a surface area with a first region and a second region. A first cured coating of a first ceramic material is located on the first region of the substrate, and a second cured coating of a second ceramic material is located on the second region of the substrate. The first coating and the second coating are different in appearance and are free of pinholes, blistering, flaking, and peeling. The first and second coatings abut one another on the substrate, with no gap between them to expose the substrate, and neither of the first coating or the second coating overlaps with the other coating on the substrate. One of the coatings may include a metallic component. At least one of the coatings requires exposure to a temperature of at least 500° and in many cases 650° Fahrenheit to cure on the substrate.

25 Claims, 2 Drawing Sheets
(2 of 2 Drawing Sheet(s) Filed in Color)

HIGH TEMPERATURE MULTI-COLOR CERAMIC COATING APPLICATION WITH PATTERNS AND/OR LETTERING

BACKGROUND OF THE INVENTION

High temperature-resistant coatings have been applied to parts such as automobile engine exhaust headers for years. These coatings are applied to make the parts more attractive and also to help dissipate heat and for corrosion resistance. Corrosion resistance is particularly useful for such applications because metal parts at high temperatures are vulnerable to corrosion, hence the advantage of a coating such as a metallic-ceramic coating. Heretofore, such coatings have needed to be a solid color or other solid appearance because multiple colors or layers could not be accomplished with a single cure.

One problem with applying patterns to a part with ceramic coating relates with the lack of being about to mask areas that have a wet coating. There are also problems associated with a cured coating.

Problems arise when attempting to apply a specific pattern on a wet (uncured) coating. The masking or stenciling materials cannot be used in contact with the uncured, wet ceramic coating surface. The ceramic coatings must be dry enough to apply traditional masking materials, such as tape, without damaging the uncured coating. In addition, the masking material must adhere to part's surface tightly enough to prevent the different coatings to be used in the layers/colors from bleeding together before or during the cure process.

The problem with a cured coating is the inability to coat a second layer over a cured coating and have good adhesion/bonding. Once the ceramic metallic coating has been successfully cured, there are no active bond sites for the next layer of coating to bond to. This condition does not allow for subsequent application of another ceramic coating. If a subsequent application of another ceramic coating is attempted, the result is defects in the coating or coating layers such as blistering, flaking, and peeling of the top coating layer.

Surface preparation on a cured coating layer using a grit blast cabinet can provide rough surface to mechanically bond to by improving the surface area available for the subsequent coating application. This is best accomplished over the entire surface area that was previously coated. However, due to the time involved in the cure process, this method is not favored.

Furthermore, the ability to blend colors & effects with various coatings is not accomplished. The reason this is not accomplished is due to the transition that results from the cured to uncured subsequent interface. This interface will have the defects that applying a coating over a cured ceramic would have. The result would be a coated article that has fissures or crevices between the two coatings.

SUMMARY OF THE INVENTION

The present invention fulfills one or more of these needs in the art by providing a coated part including a substrate having a surface area with a first region and a second region. A first cured coating of a first ceramic material is located on the first region of the substrate, and a second cured coating of a second ceramic material is located on the second region of the substrate. The first coating and the second coating differ in appearance. The difference can be by colors and/or layers. Both are free of pinholes, blistering, flaking, and peeling. Both are stable and corrosion resistant at subsequent temperatures of at least 300° Celsius. More preferably, the coatings are stable and corrosion resistant at subsequent temperatures of at least 700° Celsius In some embodiments, neither of the first coating or the second coating overlaps with the other coating on the substrate. In other embodiments, one coating is applied over the other coating. Preferably, at least one of the coatings includes a metallic component. Typically, at least one of the coatings requires exposure to a temperature of at least 500° and in many cases 650° Fahrenheit to cure on the substrate.

The first and second coatings may abut one another on the substrate, with no gap between them to expose the substrate and with neither of the first coating or the second coating overlapping with the other coating on the substrate.

In some embodiments at least one of the coatings is made up of a primer coating and an exposed coating.

In some embodiments at least one of the coatings is pearlescent in appearance.

The substrate may be metal, glass, stone, concrete, brick, and combinations of more than one of them.

The invention can also be considered as a method of coating a substrate including assuring that the substrate that has a first region and a second region is free of contaminants, applying a first coating comprising a solvent, a binder and particles of a first ceramic material on the first region of the substrate to make a partially coated substrate, exposing the partially coated substrate to a temperature high enough to flash the solvent from the first coating on the partially coated substrate but not high enough to fuse the particles of the first ceramic material into a continuous coating, applying a second coating comprising a solvent, a binder and particles of a second ceramic material on the second region of the substrate to make a more fully coated substrate, curing by exposing the more fully coated substrate to a temperature high enough to fuse the particles of the first ceramic material into a first continuous coating on the first region and the particles of the second ceramic material into a second continuous coating on the second region.

Preferably, the act of curing causes the first and second coatings to be free of pinholes, blistering, flaking, and peeling.

Assuring that the substrate is free of contaminants may include cleaning and degreasing and/or grit-blasting to remove surface corrosion, rust or oxidation.

The method may include applying a stencil to the substrate to mask the second region as the first coating is applied on the first region. The stencil may be left in place while exposing the partially coated substrate to a temperature high enough to flash the solvent from the first coating. In some embodiments a stencil may be applied to the substrate to mask the first region as the second coating is applied on the second region.

Applying a stencil may include cutting a pattern in a sheet having an adhesive backing, and bringing the cut sheet into contact with the substrate so the adhesive backing adheres the sheet to the substrate.

Exposing the partially coated substrate to a temperature high enough to flash the solvent from the first coating typically includes exposing the partially coated substrate to a temperature of less than 250° Fahrenheit, or more preferably in the range of 200-220° Fahrenheit.

Curing by exposing the more fully coated substrate to a temperature high enough to fuse the particles of the first ceramic material into a first continuous coating on the first region and the particles of the second ceramic material into a second continuous coating on the second region typically includes exposing the more fully coated substrate to a temperature of at least 500° and in many cases 650° Fahrenheit.

Applying the second coating may be performed so the first and second coatings abut one another on the substrate, with no gap between them to expose the substrate and so neither of the first coating or the second coating overlaps with the other coating on the substrate.

BRIEF DESCRIPTION OF THE DRAWINGS

The patent or application file contains color figures. Copies of this patent or patent application publication with color figures will be provided by the Office upon request and payment of the necessary fee.

The invention will be better understood by a reading of the Detailed Description of the Examples of the Invention along with a review of the drawings, in which.

DETAILED DESCRIPTION OF EXAMPLES OF THE INVENTION

Figure 1:
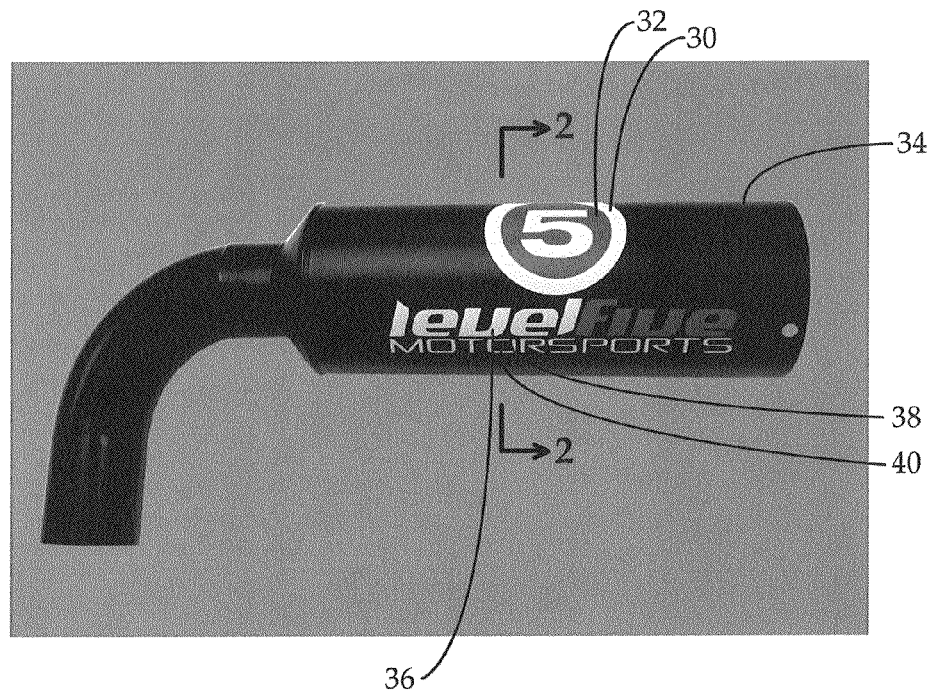
FIG. 1 is a perspective view of a part with a coating in accordance with an embodiment of the invention.

The current invention allows for application of multiple layers, colors and visual effects to be applied to an article including either a multi-cure approach (with blasting between coating applications) or a single cure approach.

Multiple applications can be made by flashing the initial coating to remove the solvent carrier between applications and reduce the creation of blisters or flaking from occurring. The flash step also allows for multiple applications of masking media to be used during the application of various colors and effects.

The solvent carrier is removed at a relatively low temperature, less than 250° F. to "flash" or evaporate the solvent from the composition before the cure, which is a step in which the particles of the coating fuse together with chemical bonds. Flashing may be considered as a forced evaporation between applications of coatings. A preferred temperature range for flashing the carrier is 200-220° F.

The process of applying the multiple coatings involves a preliminary step of a selection process for the various coating that one will apply in a pattern. The individual surface characteristics of the coatings to be applied require a stepwise approach for the application in the desired pattern. The result is a "coating plan."

For example, a coating plan may be influenced by the use of a high gloss coating which is inherently glassier than other types of coatings when cured. Once the high gloss coating is cured, bond sites will not exist on the surface. The part will require masking of the preliminary flashed-but-uncured coating followed by grit blasting to roughen the surface. Alternatively, one of the coatings to be applied may not have the same binder chemistry as an underlying coating and can only adhere by mechanical means (rough surface between coats).

Part of this selection process for the planning of applying a multi-layer design or pattern to an article includes determining if any filler materials in any of the coating layers will inhibit chemical bonding by subsequent layers. If this is this condition exists with a coating layer, in general, that layer should be the last color/coating applied to the design.

Once the ceramic coating surface characteristics are understood and planned for, the application method for that pattern of that type of coating is then determined Those of ordinary skill in the ceramic coating art are familiar with the coatings they use and can readily make these determinations.

The application of coating can be performed in any desired fashion, such as, but not limited to, application with a conventional spray gun, painted on with a brush or roller, or applied with an airbrush.

Any pattern can be applied by hand or with the aid of stencils, including templates, high temperature masking materials, or custom-printed and cut stencils. A preferred stencil is made of a sheet of Mylar or vinyl material that can withstand the exposure to the flashing of the carrier. Very elaborate patterns can be made in such material to create elaborate patterns in the coatings. Stencil materials with an adhesive on the back can be used to hold the stencil in place as a coating is applied to the substrate through voids in the stencil.

For a curved part, the design of the stencil preferably makes voids where the most extreme curvatures of the substrate exist. That enables the flat, two-dimensional stencil to most accurately be conformed to the non-planar topology of the substrate. Typically, the stencil remains in place during flashing of the solvent, so that any migration of the coating does not flow to undesired parts of the substrate.

Figure 2:
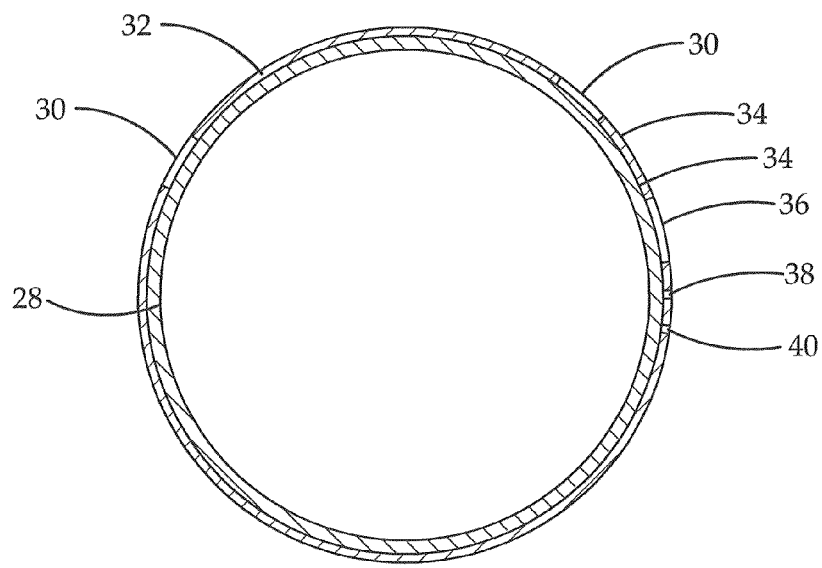
FIG. 2 is a sectional view of the embodiment of FIG. 1 taken along lines 2-2 and looking in the direction of the arrows.

FIG. 1 shows a part in accordance with an embodiment of the invention. The part has a cylindrical surface which has been coated with a mainly black color 34, but with indicia in white 30, 36, 38 and 40 and red 32. All three of these colors are a metallic-ceramic coating. A sectional view of the part is seen in FIG. 2, showing each discrete portion of the coating in section. The coating may be applied with the white color applied overall first, and given a flash to remove its solvent. Then, a stencil is applied to cover the areas that are to be white. The article is abraded, such as with grit blasting, to remove the uncured, exposed white finish, with the white under the stencil being protected. Then a further stencil is applied to cover the areas to be red, and the black coating is applied and flash dried. Finally, the stencils where the red appear are removed, and stencils applied to cover the white and black areas with the red material being added. The part is again flashed to remove the solvent from the red. Then the stencil is removed and the entire part cured.

Figure 3:
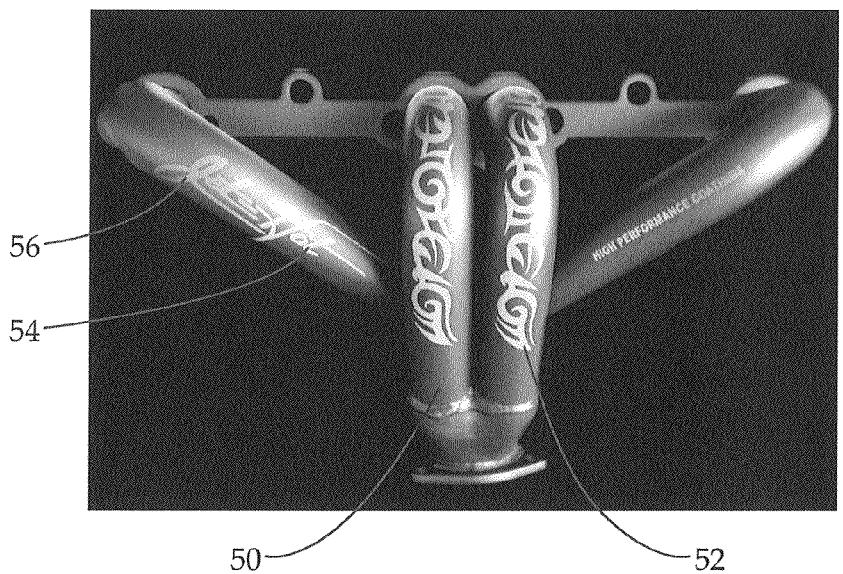
FIG. 3 is a perspective view of a part with a coating in accordance with another embodiment of the invention.

FIG. 3 shows another part with a mainly gray finish 50, and added lettering 54 and design elements 52. Each of the lettering and design elements in this embodiment has a gradation of color from a yellow area 54 to an orange area 56. This look is achieved by applying the gray finish in an overall color and flashing off its solvent. Then, a stencil is applied that covers most of the gray finish, leaving the areas to become orange and yellow exposed. The coating that will make up the orange and yellow is applied, with graded blending in the areas of transition from predominantly one color to the other. The part is again flashed to remove the solvent for the orange and yellow coating. Then, the stencil is removed and the entire part can be cured. The process just described in connection with FIG. 3 can be thought of as applying a first coating on a first region of the substrate, flashing the first coating, and applying a second coating on a second region, in which the second region is a subset of the first region.

Suitable protective coating compositions generally include the following three components: (i) a metal and/or a ceramic material, (ii) a binder, and (iii) a solvent.

1. Metals and Ceramic Materials

The coating compositions include a metal oxide as a primary component and optionally metals as a secondary metallic component. In a preferred embodiment, the coatings include at least one metal oxide and at least one metal. The combination of metal oxides (i.e., ceramics) and metals can contribute to the high temperature and corrosion resistance of the cured coating. In an exemplary embodiment, the metals and/or ceramics are provided as particulate. The particulate can be one or more sizes and can range in size from about 1 nm to about 1 mm A wide variety of ceramics and metals can be used in the protective coatings. Suitable examples include silicon, zinc, zirconium, magnesium, manganese, chromium, titanium, iron, aluminum, noble metals, molybdenum, cobalt, nickel, tungsten oxides thereof, and combinations thereof. Examples of suitable oxides include silica, calamine, zirconia, magnesia, Titania, alumina, ceria, scandia, yttria, among others. Metals, glass, and oxides can provide a pearlescent appearance to the final coat.

2. Binders

The binders used in the coating compositions are typically organic or inorganic materials that can bind the metals or ceramics before or during sintering (i.e., curing). Examples of suitable organic binders such as ethylene copolymers, polyurethanes, polyethylene oxides, various acrylics, paraffin waxes, polystyrenes, polyethylenes, celluslosic materials, polysaccharides, starch, proteins, "agar," and other materials. Suitable inorganic binders include silicon based binders such as soda silicate, kairome clay, titanium based binders such as Titania sol and other inorganic binders such as aluminum phosphate. Some colors are best bound using high performance thermoplastic materials.

3. Solvents

Any solvent can be used to combine and/or deliver the metal and/or ceramic material so long as the solvent is compatible with the particular metals and/or ceramics and binders being used. Examples of suitable solvents include polar solvents such as water, methanol, and ethanol and non-polar organic solvents such as benzene and toluene.

C. Manufacturing the Coating Compositions

The protective coating compositions are typically designed to provide a coating that can withstand elevated temperatures and harsh, corrosive conditions. In an exemplary embodiment the protective coating are stable and corrosion resistant to temperatures in a range from about 300° C. to about 700° C. or in some case up to 1000° C.

The coating compositions are made by selecting one or more metal oxides or metals, one or more binders, and one or more solvents and then mixing the components to form a paste or slurry. In an exemplary embodiment, the metal oxide is the predominant component. The metal oxide gives the protective coating heat resistance and resistance to corrosion. The metal oxide is typically included in an amount in a range from about 30 wt % to about 70 wt % of the coating composition (i.e., the uncured composition).

Metals can be included in the coating composition, typically in smaller amounts than the metal oxide. In a preferred embodiment, the amount of metal in the coating composition is in a range from about 0.5 wt % to about 20 wt %. The metals can give the coating toughness and heat resistance and help with the curing process.

The solvent is typically included in an amount that ranges from about 10 wt % to about 30 wt % of the coating composition. The solvent serves as a carrier or medium for mixing the metal oxides, metals, and binders, which typically form a suspension rather than dissolve in the solvent. The consistency of the coating composition can be adjusted by adding greater or lesser amounts of solvent. If desired, the coating composition can be made into a slurry, such that it can be applied by spray coating.

The metal oxides, metals, binders, and/or solvents may be selected to give the uncured coating composition high emissivity. Protective coating compositions that have high emissivity can be cured at relatively low temperatures using infrared radiation. The coating composition preferentially absorbs infrared energy, thus heating up, while low emissivity uncoated portions tend to reflect the infrared energy, thereby remaining cooler. In some embodiments, the coating composition has an emissivity of greater than about 0.7, more preferably greater than about 0.9, and most preferably greater than about 0.95. The emissivity of a material can depend on the temperature. The emissivity value is based on the emissivity of the coating composition at the curing temperature.

The flash and/or cure of the coating on the part may be performed inside a convection oven that circulates heated air around the part during operation. This provides and even heat more uniformly on the surfaces inside the oven, in comparison to an infra-red oven that may create hot-spots, depending on the configuration, distance or angle from the emitter of infrared radiation.

The coating process can include:

RECEIVING: Incoming parts are checked for substrate issues, shipping damage and compatibility.

CLEANING: Next the parts are cleaned and prepared them for coating. Parts are sent through a degreasing process to remove all oil and grease residue from the surfaces of the part.

SURFACE PREPARATION: Parts are grit-blasted using a virgin aluminum oxide to remove any surface corrosion, rust or oxidation. The parts are now ready for the coating application.

COATING: Parts are coated in accordance with their coating plan.

CURE COATING: Using electronically-controlled ovens, the coating is cured onto the part by heating it to a specific temperature.

INSPECTION: The part is then inspected to ensure the coating application is free of any defects that may have occurred during the coating application.

POLISHING: Parts are polished in vibratory machines to achieve a shiny polished finish. If the part is receiving a colored topcoat, it is lightly blasted to prepare the base coat, coated in the respective color coating, followed by an additional cure.

In addition to metal substrates, the patterned coating could be applied to substrates of glass, stone, concrete, brick, etc.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A coated part comprising
a substrate having a surface area with a first region and a second region,
a first cured coating of a first ceramic material on the first region of the substrate and a second cured coating of a second ceramic material on the second region of the substrate, both the first coating and the second coating being different in appearance and being free of pinholes, blistering, flaking, and peeling and being stable and corrosion resistant at subsequent temperatures of at least 300° C.

2. A coated part as claimed in claim 1 wherein neither of the first coating or the second coating overlaps with the other coating on the substrate.

3. A coated part as claimed in claim 1 wherein at least one of the coatings includes a metallic component.

4. A coated part as claimed in claim 1 wherein at least one of the coatings requires exposure to 500° Fahrenheit to cure on the substrate.

5. A coated part as claimed in claim 1 wherein the first and second coatings abut one another on the substrate, with no gap between them to expose the substrate and neither of the first coating or the second coating overlaps with the other coating on the substrate.

6. A coated part as claimed in claim 1 wherein at least one of the coatings is made up of a primer coating and an exposed coating.

7. A coated part as claimed in claim 1 wherein at least one of the coatings is pearlescent in appearance.

8. A coated part as claimed in claim 1 wherein the first coating and the second coating are stable and corrosion resistant at subsequent temperatures of at least 700° C.

9. A coated part as claimed in claim 1 wherein the second region is a subset of the first region.

10. A coated part as claimed in claim 1 wherein each coating is made of a ceramic-metallic material and a binder, in which
the ceramic-metallic material is selected from the group consisting of silicon, zinc, zirconium, magnesium, manganese, chromium, titanium, iron, aluminum, noble metals, molybdenum, cobalt, nickel, tungsten oxides, silica, calamine, zirconia, magnesia, titania, alumina, ceria, scandia, yttria, and combinations thereof, and
the binder is selected from the group consisting of ethylene copolymers, polyurethanes, polyethylene oxides, acrylics, paraffin waxes, polystyrenes, polyethylenes, cellulosic materials, polysaccharides, starch, proteins, "agar," soda silicate, kairome clay, titania sol, and aluminum phosphate and combinations thereof.

11. A coated part comprising
a metal substrate having a surface area with a first region and a second region,
a first cured coating of a first ceramic material on the first region of the substrate and a second cured coating of a second ceramic material on the second region of the substrate, both the first coating and the second coating different in appearance and being free of pinholes, blistering, flaking, and peeling, the first and second coatings abutting one another on the substrate, with no gap between them to expose the substrate and neither of the first coating or the second coating overlaps with the other coating on the substrate,
wherein at least one of the coatings includes a metallic component,
wherein at least one of the coatings requires exposure to 650° Fahrenheit to cure on the substrate.

12. A method of coating a substrate comprising
assuring that the substrate that has a first region and a second region is free of contaminants,
applying a first coating comprising a solvent, a binder and particles of a first ceramic material on the first region of the substrate to make a partially coated substrate,
exposing the partially coated substrate to a temperature high enough to flash the solvent from the first coating on the partially coated substrate but not high enough to fuse the particles of the first ceramic material into a continuous coating,
applying a second coating comprising a solvent, a binder and particles of a second ceramic material on the second region of the substrate to make a more fully coated substrate,
curing by exposing the more fully coated substrate to a temperature high enough to fuse the particles of the first ceramic material into a first continuous coating on the first region and the particles of the second ceramic material into a second continuous coating on the second region.

13. A method as claimed in claim 12 wherein the act of curing causes the first and second coatings to be free of pinholes, blistering, flaking, and peeling.

14. A method as claimed in claim 12 wherein the second region is a subset of the first region.

15. A method as claimed in claim 12 wherein assuring that the substrate is free of contaminants includes grit-blasting to remove surface corrosion, rust or oxidation.

16. A method as claimed in claim 12 further comprising applying a stencil to the substrate to mask the second region as the first coating is applied on the first region.

17. A method as claimed in claim 16 further comprising leaving the stencil in place while exposing the partially coated substrate to a temperature high enough to flash the solvent from the first coating.

18. A method as claimed in claim 11 further comprising applying a stencil to the substrate to mask the first region as the second coating is applied on the second region.

19. A method as claimed in claim 11 wherein exposing the partially coated substrate to a temperature high enough to flash the solvent from the first coating includes exposing the partially coated substrate to a temperature of less than 250° Fahrenheit.

20. A method as claimed in claim 11 wherein exposing the partially coated substrate to a temperature high enough to flash the solvent from the first coating includes exposing the partially coated substrate to a temperature of in the range of 200-220° Fahrenheit.

21. A method as claimed in claim 11 wherein curing by exposing the more fully coated substrate to a temperature high enough to fuse the particles of the first ceramic material into a first continuous coating on the first region and the particles of the second ceramic material into a second continuous coating on the second region includes exposing the more fully coated substrate to a temperature of at least 500° Fahrenheit.

22. A method as claimed in claim 11 wherein curing by exposing the more fully coated substrate to a temperature high enough to fuse the particles of the first ceramic material into a first continuous coating on the first region and the particles of the second ceramic material into a second continuous coating on the second region includes exposing the more fully coated substrate to a temperature of at least 650° Fahrenheit.

23. A method as claimed in claim 16 wherein applying a stencil includes cutting a pattern into a sheet that has an adhesive backing, and bringing the cut sheet into contact with the substrate so the adhesive backing adheres the sheet to the substrate.

24. A method of coating as claimed in claim 11 wherein applying the second coating is performed so the first and second coatings abut one another on the substrate, with no gap between them to expose the substrate and neither of the first coating or the second coating overlaps with the other coating on the substrate.

25. A method of coating a substrate that has a first region and a second region comprising
applying a first coating comprising a solvent, a binder and particles of a first ceramic material on the substrate to make a raw coated substrate,
exposing the raw coated substrate to a temperature high enough to flash the solvent from the first coating on the raw coated substrate but not high enough to fuse the particles of the first ceramic material into a continuous coating, applying a stencil to the raw coated substrate to cover the first region, abrading the raw coated substrate to remove the first coating from the second region, applying a second coating comprising a solvent, a binder and particles of a second ceramic material on the second region of the substrate to make a more fully coated substrate and removing the stencil from the first region, curing by exposing the more fully coated substrate to a temperature high enough to fuse the particles of the first ceramic material into a first continuous coating on the first region and the particles of the second ceramic material into a second continuous coating on the second region.

* * * * *